R. H. SPAULDING.
RUNNER ATTACHMENT FOR BABY CARRIAGES.
APPLICATION FILED SEPT. 21, 1918.

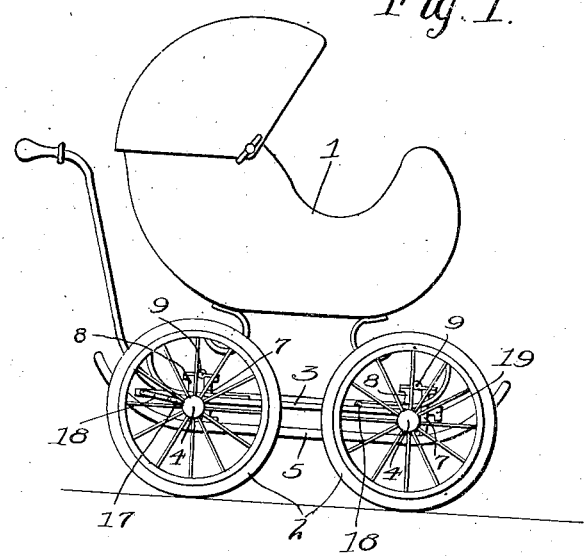
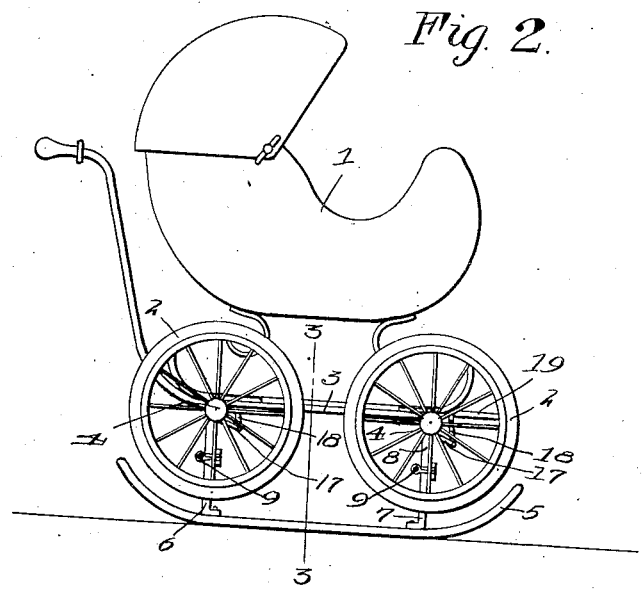

1,307,275.

Patented June 17, 1919.
2 SHEETS—SHEET 2.

Witnesses
R. A. Thomas

Inventor
Roy H. Spaulding
By Victor J. Evans
Attorney

UNITED STATES PATENT OFFICE.

ROY H. SPAULDING, OF BATTLE CREEK, MICHIGAN.

RUNNER ATTACHMENT FOR BABY-CARRIAGES.

1,307,275.  Specification of Letters Patent.  Patented June 17, 1919.

Application filed September 21, 1918. Serial No. 255,084.

*To all whom it may concern:*

Be it known that I, ROY H. SPAULDING, a citizen of the United States, residing at Battle Creek, in the county of Calhoun and State of Michigan, have invented new and useful Improvements in Runner Attachments for Baby-Carriages, of which the following is a specification.

This invention relates to new and useful improvements in sleigh runners for baby carriages and the principal object of the invention is to provide means for moving the runners into and out of operative position.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claim.

Figure 1 is a side view of a baby carriage to which my invention is applied.

Fig. 2 is a like view with the runners in operative position.

Figure 4:
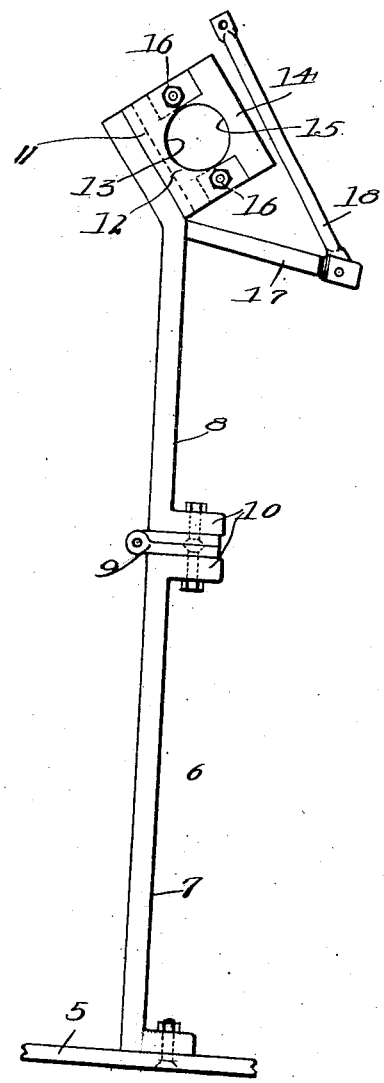
Fig. 4 is an enlarged detail view of one of the supporting legs for the runners.
Figure 5:
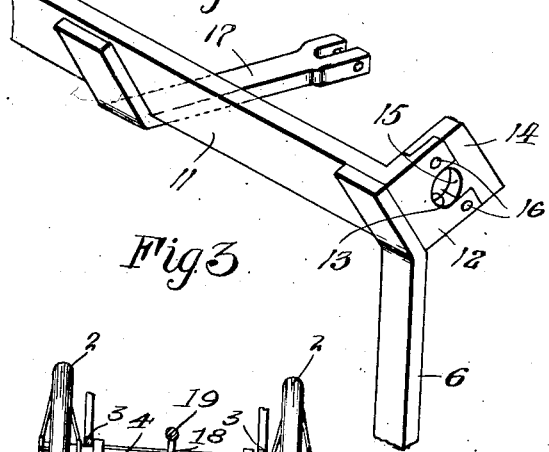
Fig. 5 is a perspective view of a part of the attachment.
Figure 3:
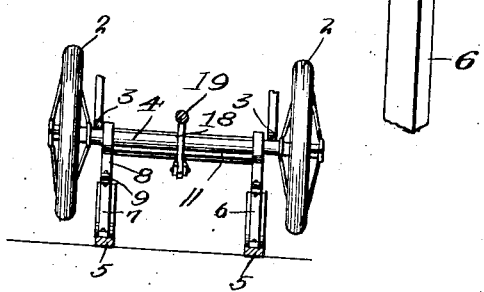
Fig. 3 is a cross section on line 3—3 of Fig. 2.

In these views 1 indicates the carriage body and 2 the wheels thereof. 3 indicates part of the frame which connects the front and rear axles 4.

5 indicates the runners, it being understood that a pair of these runners are used. Said runners are provided with curved ends and are of such a length as to extend slightly beyond the wheels. Each runner is provided with a pair of legs 6, each of which is formed of two parts 7 and 8 connected together by a hinge 9. Each of the parts 7 and 8 are provided with a bent end 10 and the leaves of the hinge 9 are secured to these bent ends. The part 7 is bolted to the runner while the part 8 has its upper end bolted to a bar 11 which extends parallel with the axle and is movably secured to said axle. This bar is connected with the axle by means of its bent ends 12 having curved recesses 13 therein for receiving the axle. A block 14, also provided with a curved recess 15 is bolted to each of the bent ends 12 by means of the bolts 16. In this way the bar 11 may rotate on the axle. An arm 17 is connected with said bar and extends at an angle therefrom. A link 18 is hinged to the outer end of said arm 17 and this link is pivoted to a longitudinally extending bar 19 which is slidably supported above the axles. The upper face of this bar 19 engages the under part of the frame 3 so as to prevent upward movement of said bar.

It will thus be seen that with the parts in the position shown in Fig. 1 with the runners in raised position, when the rod 19 is moved rearwardly the bar 11 will be rotated on the axles to throw the supporting legs downwardly and thus move the runners into operation position below the wheels. When the bar 19 is moved in the opposite direction the runners will be raised.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A runner attachment for baby carriages, comprising a pair of bars having their ends bent at right angles, said bent ends having semi-circular recesses therein for engaging the axles of the carriage, blocks having semi-circular recesses therein, coöperating with the recesses in the bars, means for connecting the blocks to the bent ends of the bars, depending legs having their upper ends secured to said bars, said legs being formed in sections, means for hinging the sections of each leg together, runners connected with the lower ends of said legs, an arm connected with each bar, a longitudinally movable member and a link connecting each arm to said member.

In testimony whereof I affix my signature.

ROY H. SPAULDING.